United States Patent [19]

Laub, Jr. et al.

[11] 4,150,450
[45] Apr. 24, 1979

[54] THREAD REFORMING TOOL WITH LOCKABLE ROTARY JAW STRUCTURE

[76] Inventors: Henry A. Laub, Jr., 1736 N. Allen, Pasadena, Calif. 91104; Steven D. Laub, 9340 E. Olive St., Temple City, Calif. 91780

[21] Appl. No.: 871,631

[22] Filed: Jan. 23, 1978

[51] Int. Cl.² .............................................. B23G 5/00
[52] U.S. Cl. ...................................... 10/1 B; 10/111; 10/123 P
[58] Field of Search ................. 10/1 B, 111, 120, 123, 10/123 P; 72/703; 408/215, 218

[56] References Cited

U.S. PATENT DOCUMENTS

| | | | |
|---|---|---|---|
| 1,017,403 | 2/1912 | Garbarino et al. | 10/1 B |
| 1,754,489 | 4/1930 | Stevenson | 10/1 B |
| 2,495,318 | 1/1950 | Dyson et al. | 10/1 B |
| 2,508,291 | 5/1950 | Porro | 10/1 B |
| 3,793,659 | 2/1974 | Edgar | 10/1 B |

*Primary Examiner*—E. M. Combs
*Attorney, Agent, or Firm*—William W. Haefliger

[57] ABSTRACT

Apparatus for re-forming a helical screw thread includes a carrier; opposed jaws to be received in thread defined grooves at opposite sides of the body forming the thread; one jaw carried in fixed position by the carrier; a shaft mounting the other jaw and defining an axis of rotation; and brake means on the carrier and adjustable to selectively prevent rotation of the shaft and other jaw after the latter has been received in a thread groove, so that the jaw relative positions may remain fixed during thread re-forming.

3 Claims, 4 Drawing Figures

U.S. Patent
Apr. 24, 1979
4,150,450
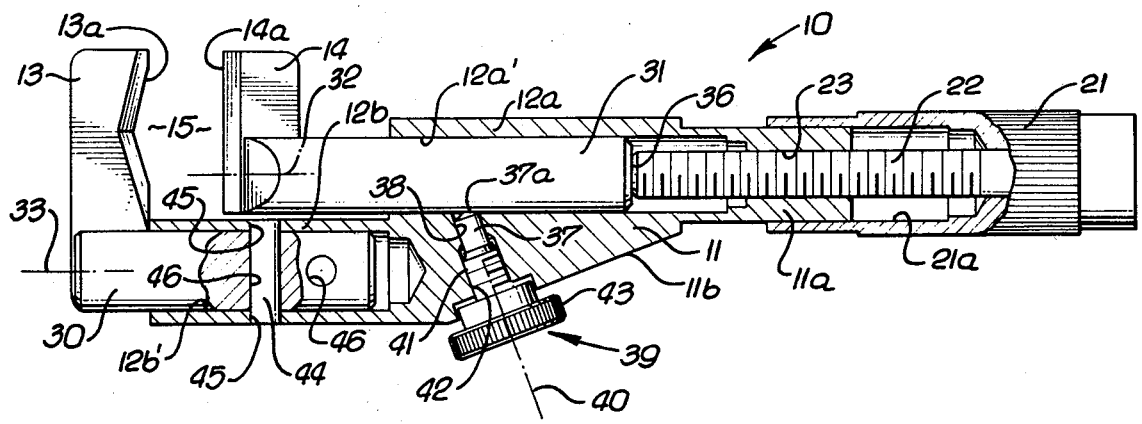
FIG. 1.
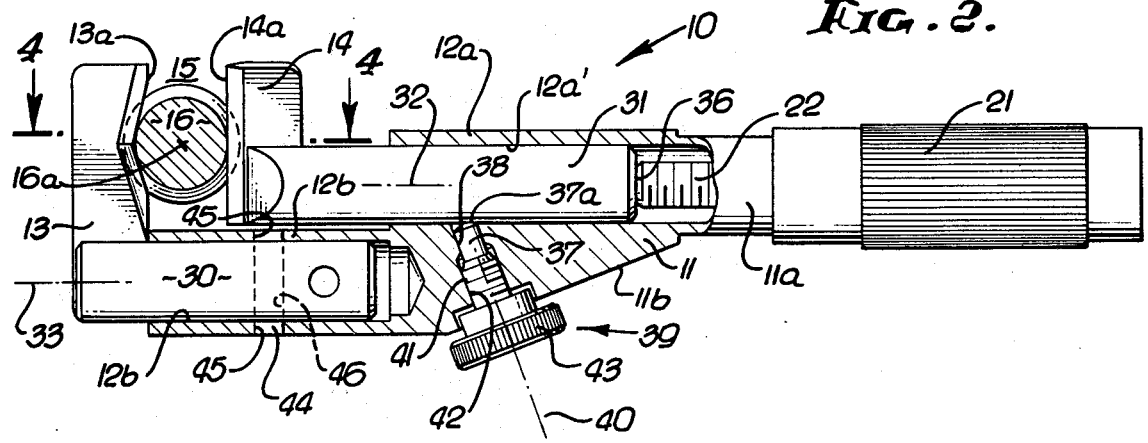
FIG. 2.
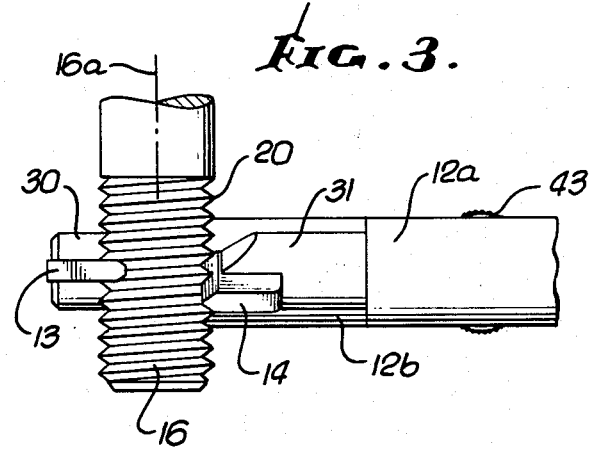
FIG. 3.
FIG. 4.

4,150,450

THREAD REFORMING TOOL WITH LOCKABLE ROTARY JAW STRUCTURE

BACKGROUND OF THE INVENTION

This invention relates generally to thread re-forming, and more particularly concerns the provision of a simple, easily adjusted, and lockable tool for effecting such re-forming.

The helical thread of fasteners and on other bodies often become deformed to the extent that nuts cannot be advanced or retracted. Thread re-forming then becomes necessary. One adequate tool described in U.S. Pat. No. 3,793,659 includes a pair of thread engaging jaws carried by a support, one jaw being carried on an adjustable shaft. When the tool including the jaws is forcibly rotated relative to the thread whose groove is penetrated by the jaws, the thread is re-formed.

The present invention constitutes an improvement on the tool described in that patent, in that it enables additional functions and modes of operation. These include selective locking of one or both jaws against relative rotation so that their "rotary" spacing is maintained constant during thread re-forming; selective locking of the jaws against relative movement linearly toward and away from one another during thread re-forming and, relative rotary and linear adjustment of the jaws prior to and after such re-forming, all for purposes of enhancing the quality of thread re-forming, accommodating the tool to different size thread, and facilitating ease of operation and adjustment.

SUMMARY OF THE INVENTION

It is a major object of the invention to provide an improved thread re-forming tool which accomplishes the above objectives. Basically, it comprises apparatus including (a) carrier means, (b) opposed jaws shaped for reception in the thread defined groove at opposite sides of the body, one of the jaws carried by the carrier means, (c) a shaft carrying the other jaw and defining an axis about which said other jaw and shaft are rotatable, and it embodies the improvement comprising:

(d) brake means on the carrier means and adjustable to selectively prevent rotation of said shaft and other jaw about said axis after said other jaw has been received in the thread defined groove, whereby the rotary position of said other jaw relative to the one jaw may be positively fixed during re-forming of the thread as the jaws are rotated relatively about said body.

As will appear, the brake means typically includes a braking element in a bore formed in the carrier, and a manually adjustable member is located to exert force acting to push the element against the shaft; the element may advantageously have a conical tip to engage the shaft with maximum braking force when the member, which threadably interfits the carrier means, is rotated to urge the element toward the shaft; and a second shaft is advantageously provided to carry the one jaw and to be shiftable in a bore formed in the carrier means, for adjustment to different diameter threads and externally threaded bodies. A connector pin is typically provided to lock the second shaft in fixed endwise and rotary position, and the first shaft is then adjustable linearly and rotatably relative to the second shaft, after which the first shaft is braked or locked, as will appear.

These and other objects and advantages of the invention, as well as the details of an illustrative embodiment, will be more fully understood from the following description and drawings, in which:

DRAWING DESCRIPTION

FIG. 1 is a front elevation, partly broken away;

FIG. 2 is a view like FIG. 1, but showing a fastener thread gripped by the tool;

FIG. 3 is a top plan view of the FIG. 2 tool; and

FIG. 4 is a section taken on lines 4—4 of FIG. 2.

DETAILED DESCRIPTION the apparatus shown in FIGS. 1 and 2 includes support or carrier means 10 including a body 11 and two cylinders 12a and 12b which extend in horizontally parallel, vertically staggered relation. Both cylinders open to the left, as shown, and are advantageously formed integrally with body 11.

Multiple jaws such as those indicated at 13 and 14 define a zone 15 between them to receive a threaded body, as for example a fastener as appears at 16, in FIG. 2. The fastener has an axis at 16a. One of the jaws, as for example jaw 13, is carried by cylindrical shaft 30 closely and slidably received in bore 12b' of cylinder 12b, whereby that jaw is carried by the carrier means 10. Jaw 13 projects upwardly as shown at the outer end of the shaft, to which the jaw may be connected as by brazing. The other jaw is carried by cylindrical shaft 31 closely and slidably received in bore 12a' of cylinder 12a, whereby that jaw is also carried by means 10. Both shafts are slidable lengthwise in their bores, in the direction of parallel axes 32 and 33, and both shafts are also rotatable about those axes.

The jaws have edges 13a and 14a which are elongated generally vertically, and which taper laterally oppositely toward one another for forcible reception in the groove 19 defined by the thread 20, as is clear from FIG. 4. For this purpose, jaw 14 is rotatable about axis 32 so as to accurately fit the thread groove, for thread re-forming; in this regard, both the jaw 14 and the shaft 31, being integrally connected, rotate together, and also move axially linearly together.

Manually rotatable adjustable means is provided to have threaded engagement with the carrier means and to be endwise engageable with shaft 31 to effect advancement of the latter with jaw 14 thereon toward the one jaw 13. As shown, the adjustable means may include a knob 21 in the form of a sleeve having a bore 21a to receive a tubular portion 11a of the carrier body. Such means also includes a plunger or shank 22 which may have threaded connection at 23 to portion 11a, the plunger endwise engaging the shaft 31 at 36 to advance same and secure forcible jaw clamping of the thread 20 to be re-formed.

Simultaneous manual turning of jaw 14 slightly about axis 32 secures accurate fitting of that jaw into the appropriate thread groove extent, as in FIGS. 3 and 4. It will be noted that tapered edge 13a of jaw 13 is concave in a vertical plane, i.e. lengthwise of that edge, to fit into the thread groove along the convexly curved length thereof, for most efficient re-forming action. Note that in the example shown, the taper of the thread, and jaw taper, is about 60°; however, other taper angles are possible.

In accordance with an important feature of the invention, brake means is provided on the carrier means, and is adjustable to selectively prevent rotation of shaft 31 and jaw 14 about axis 32 after jaw 14 has been slightly rotated, as described, to be received into the thread defined groove. As a result, the rotary position of jaw 14 relative to the carrier and relative to jaw 13, may be positively fixed, to aid in re-forming of the thread as the jaws are rotated relatively about body 11. In the example shown, the brake means includes a braking element, as at 37, in a bore 38 formed in the carrier body 11, and a manually adjustable member 39 is located to selectively exert force acting to push the element 37 frictionally against the periphery of shaft 31. The element 37 is typically cylindrical to closely fit bore 38, and it preferably has a conically tapered tip 37a engageable with slant height the shaft with line contact, the axis 40 of bore 38 being at an acute (non-90°) angle relative to shaft axis 32. Member 39 typically has threaded interfit at 41 with the body bore 42, and it includes an external knob 43 which is protectively located adjacent body taper 11b.

The second shaft 30 is also axially shiftable in its bore 12b', and a connection is provided to hold the second shaft, and jaw 13 integral therewith, at a selected axial position relative to the bore, the jaw remaining in a vertical plane as shown. Such a connection may take the form of a pin 44 received into transversely spaced openings 45 in cylinder 12b, and through transverse opening 46 in the shaft 30. The latter may have one or more additional transverse openings, as shown, whereby the jaw 13 may be locked at discrete spacings from the body 11, to accommodate to different sized threads to be re-formed.

We claim:

1. In apparatus for re-forming a helical screw thread on a body, said apparatus including
   (a) carrier means,
   (b) opposed jaws shaped for reception in the thread defined groove at opposite sides of the body, one of the jaws carried by the carrier means,
   (c) a shaft carrying the other jaw and defining an axis about which said other jaw and shaft are rotatable, the improvement comprising:
   (d) brake means on the carrier means and adjustable to selectively prevent rotation of said shaft and other jaw about said axis after said other jaw has been received in the thread defined groove, whereby the rotary position of said other jaw relative to the one jaw may be positively fixed during re-forming of the thread as the jaws are rotated relatively about said body,
   (e) said brake means including a braking element in a bore formed in the carrier means, and a manually adjustable member located to exert force acting to push said element against said shaft, said element being cylindrical and having a conically tapered tip with a slant height surface portion engageable with said shaft, and said member having threaded interfit with the carrier means, said conically tapered tip having an axis extending acutely relative to the axis of the shaft so that said slant height surface portion has substantial surface engagement with the shaft,
   (f) there being a second shaft carrying the one jaw, both of said shafts extending in parallel relation and carried by the carrier means, said member being in the path of an endwise extension of said second shaft,
   (g) the member including a manually rotatable knob protectively located closely adjacent a relieved wall defined by the carrier.

2. The apparatus of claim 1 wherein the second shaft is received in a bore formed by the carrier means, the second shaft axially shiftable in said bore, and a connection holding the second shaft at a selected axial position relative to said bore.

3. The apparatus of claim 2 wherein said connection comprises a pin received transversely in aligned recesses formed in the second shaft and in the carrier means.

* * * * *